US012457206B2

(12) United States Patent
Singh

(10) Patent No.: US 12,457,206 B2
(45) Date of Patent: Oct. 28, 2025

(54) TECHNIQUES FOR RISK EVALUATION OF ACCESS EVENTS

(71) Applicant: Salesforce, Inc., San Francisco, CA (US)

(72) Inventor: Pushkar Singh, Sammamish, WA (US)

(73) Assignee: Salesforce, Inc., San Francisco, CA (US)

( * ) Notice: Subject to any disclaimer, the term of this patent is extended or adjusted under 35 U.S.C. 154(b) by 199 days.

(21) Appl. No.: 18/341,069

(22) Filed: Jun. 26, 2023

(65) Prior Publication Data

US 2024/0430247 A1    Dec. 26, 2024

(51) Int. Cl.
*H04L 9/40* (2022.01)
(52) U.S. Cl.
CPC .................................... *H04L 63/08* (2013.01)
(58) Field of Classification Search
None
See application file for complete search history.

(56) References Cited

U.S. PATENT DOCUMENTS

| 2016/0078120 A1* | 3/2016 | Pradeep | G06F 11/3438 707/737 |
| 2016/0105420 A1* | 4/2016 | Engan | H04W 12/068 455/411 |
| 2016/0125522 A1* | 5/2016 | Tang | G06Q 40/00 705/35 |
| 2020/0293638 A1* | 9/2020 | Rose | H04L 63/1425 |
| 2024/0022593 A1* | 1/2024 | Costa | H04L 63/102 |
| 2024/0356965 A1* | 10/2024 | Chu | H04L 63/1466 |

* cited by examiner

*Primary Examiner* — Raqiul A Choudhury
(74) *Attorney, Agent, or Firm* — Holland & Hart LLP

(57) ABSTRACT

A system may receive, via a cloud-based platform supporting a plurality of tenants, one or more access events from a user of a host platform associated with a tenant, the one or more access events comprising one or more keystroke events at the host platform and one or more commands inputted by the user at the host platform, wherein the one or more access events are captured by a continuous authentication agent associated with the host platform. The system may identify fraudulent access events based at least in part on executing a machine learning model to perform a pattern matching between previously authenticated browsing behavior of the user and the one or more access events at the host platform. The system may generate a challenge question for reauthenticating the user of the host platform based at least in part on identifying the at least one fraudulent access event.

18 Claims, 9 Drawing Sheets

TECHNIQUES FOR RISK EVALUATION OF ACCESS EVENTS

FIELD OF TECHNOLOGY

The present disclosure relates generally to database systems and data processing, and more specifically to techniques for risk evaluation of access events.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some data processing systems, users accessing the system may be authenticated by various means. However, such approaches may be improved.

DETAILED DESCRIPTION

Figure 1:
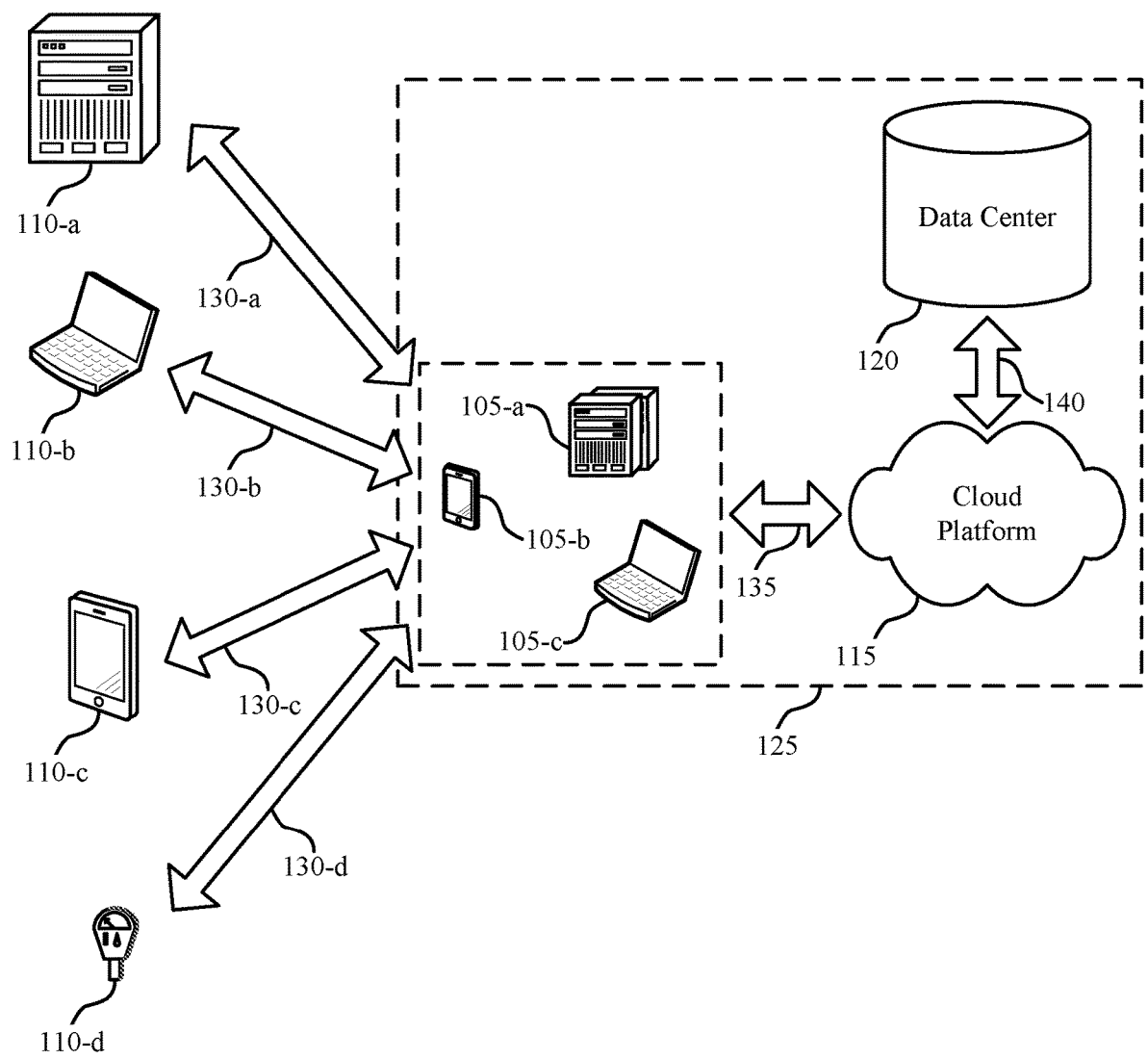
FIG. 1 illustrates an example of a data processing system that supports techniques for risk evaluation of access events in accordance with examples as disclosed herein.

A cloud platform may manage many tenants where one or more members of the tenant may have unlimited access to a tenant-specific system on the cloud platform. Such members may have elevated access (e.g., capable of running elevated commands, such as "sudo" commands) and may use commands (such as "strace"), where such members can monitor keystrokes of other users on the hosts. This may open the cloud platform to many internal threat vulnerabilities on its data and infrastructure. Additionally, if a particular member has administrator privileges, then opaque engineering practices may be implemented. In such opaque engineering practices, remote sessions (e.g., SSH sessions) from a bastion may run scheduled jobs which may not be measured by the cloud platform. However, such administrator profiles may be compromised due to brute force attacks, man in the middle attacks, phishable one time passwords, and many more threat vectors. In such cases, due to such access available to the administrators, fraudulent users may also get unlimited access to the system. Thus, improved authentication (e.g., using artificial intelligence/machine learning techniques) may be used to reduce intrusiveness by leveraging identification mechanisms to recognize the user's behavior and context to allow access or spot an attacker.

The techniques described herein provide for training and implementing a machine learning model that uses the data plane access events (e.g., SSH or other remote session keystrokes) to detect if a user's activity is related to an actual user or a fraudulent user. In particular, the machine learning model may access one or more data plane access events and/or other events running on hosts for inline evaluation using a serving or inference capability. In particular, the subject matter described herein includes a continuous authentication and risk evaluation techniques where an agent is deployed on each host (or a host communicates with the agent, e.g., via a connector) and the agent captures login and authorization events in real time. An agent of such a system may capture login authorization events followed by keystrokes and other commands made by users on the host platform. The system may then identify a suspicious command or detect a suspicious pattern of keystrokes based on monitoring data plane access events at the host platform. In response to detecting an unusual activity pattern, the agent may provide challenge questions or other challenges (e.g., authentication methods different than authentication methods previously used) for reauthenticating the user. Such detections may be more computationally efficient, may provide for reauthentication of users after an explicit login method is used, and may be resilient in changing environments as to not retrain too frequently.

In some examples, the system may monitor for initial login activity that uses a first authorization method and may then monitor access events for the user to determine whether such access events are fraudulent or not. In cases in which such access events are determined to be fraudulent, the system may initiate a reauthorization procedure and generate an authentication challenge for the user. In some examples, such an authentication challenge may be satisfied by a different authentication method than an authentication method used previously (e.g., used for initial login). In some examples, the system may train the machine learning model using known fraudulent events, browsing behaviors, one or more flagged commands or keystrokes, one or more other instances of training data related to authentication or use of a host, or any combination thereof.

Aspects of the disclosure are initially described in the context of an environment supporting an on-demand database service. Aspects of the disclosure are then described with reference to authentication systems and a process flow. Aspects of the disclosure are further illustrated by and described with reference to apparatus diagrams, system diagrams, and flowcharts that relate to techniques for risk evaluation of access events.

FIG. 1 illustrates an example of a system 100 for cloud computing that supports techniques for risk evaluation of access events in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

For example, the system 100 may provide remote access or remote sessions to the cloud clients 105. A user of a cloud client 105 may log in to the cloud platform 115 to perform one or more tasks. The system 100 may receive one or more access events performed by the cloud client 105 on the cloud platform 115, which may include keystroke events, commands, or both. The system 100 may identify a fraudulent access event by using a machine learning model and may generate a challenge (e.g., a challenge question) to which the user of the cloud client 105 may satisfactorily respond to continue the remote session.

Some approaches for identity and access management may not provide further authentication beyond authentication that may be performed in associated with an initial session login. For example, a remote session may be established using credentials, but some approaches may not provide any additional authentication for the duration of the session. As such, there are few opportunities for analysis and monitoring of access controls to detect unauthorized use. Further, such limited responses may also be slow to respond to attacks or intrusions and may only analyze damage and effects related to threats, reacting too slowly to prevent or respond in time. At the same time, some approaches for security may cause excessive friction or obstacles to authorized users or tenants. Further, some users that may have elevated or privileged access, and some approaches may provide little or no oversight of such users, which may provide opportunities for unintentional or intentional security problems by such users.

The techniques described herein may provide for rapid, inline monitoring and response to fraudulent or unauthorized intrusions or operations. By providing an agent that operates on a host platform and that is connected to an authentication service (e.g., that may utilize machine learning approaches or models), a system may detect suspicious activity and the tenant or user may reauthenticate to continue a session on the host platform. The techniques described herein may also reduce intrusiveness by leveraging identification mechanisms to recognize a user's behavior and context to allow access or quickly spot an attacker, as appropriate. Further, elevated challenge frameworks and adaptive authorization as described herein can provide increased fiction to bad, unethical logins and provide little or no friction to legitimate users. Further, the approaches herein may also be applied to monitor users that have elevated or privileged access, thereby providing oversight and monitoring of such users while still allowing proper elevated or privileged access that may be used to perform one or more legitimate tasks.

For example, a user may login to a remote session through a tenant of a could platform. The user may provide one or more credentials to establish the remote session. In the course of the remote session, the user may engage in one or more access events that the system may analyze (e.g., using machine learning approaches or models) to determine whether such access events are legitimate or are fraudulent. If an access event is determined to be suspicious or fraudulent, the system may transmit a challenge (e.g., a challenge questions or a reauthentication challenge) to the user to verify that the user and/or the access events are legitimate. In this way, the system may provide more friction to unauthorized operations while reducing the burden on authorized operations, while also providing more continuous monitoring and authentication processes to increase security.

It should be appreciated by a person skilled in the art that one or more aspects of the disclosure may be implemented in a system 100 to additionally or alternatively solve other problems than those described herein. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
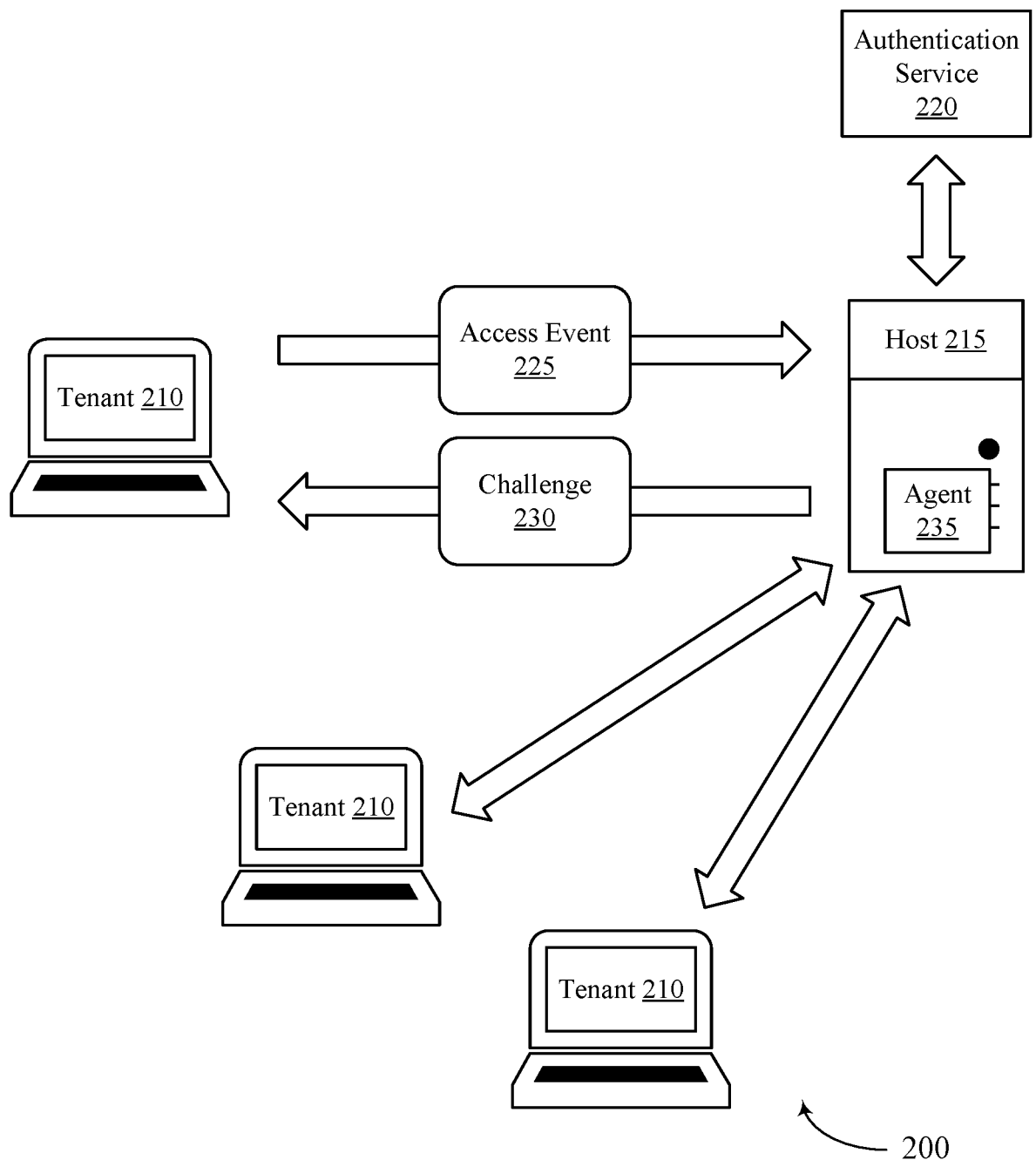
FIG. 2 shows an example of an authentication system that supports techniques for risk evaluation of access events in accordance with examples as disclosed herein.

FIG. 2 shows an example of an authentication system 200 that supports techniques for risk evaluation of access events in accordance with examples as disclosed herein.

In the course of operating cloud platforms that offer remote access, certain threats may exist, such as usage of commands such as "strace" where those with elevated access may monitor keystrokes of other users on the hosts. This may open the cloud platform to internal threat vulnerabilities on data and infrastructure. Further, opaque engineering practices may exists where certain remote sessions (e.g., SSH sessions) may run scheduled jobs which are not measured.

With the prevalence of security threats, including social engineering, brute force attacks, main in the middle attacks, phishing, and other threat vectors that constantly evolve, identity and access management security options should also evolve and develop measurements and proactive mitigation strategies that can respond quickly to threats. As such, standardization and improvement of identity and access management security (e.g., that includes zero trust security postures) may improve the overall security of a cloud platform, including user sessions, hosts, and infrastructure. Also, some approaches for authentication do not reauthenticate users after an explicit login method is used (e.g., a password, fingerprint, or face recognition). However, in such approaches, effectiveness of control measurement is reduced. As such, the techniques described herein may reduce or eliminate the problems present in other approaches.

For example, a tenant 210 may perform an access event 225 (or multiple access events 225) while connected to a host 215 (e.g., operating a remote connection or remote session with the host 215). Such an access event 225 may include one or more keystrokes, one or more commands, one or more operations, one or more program executions, one or more text entries, one or more other access events, or any combination thereof. In some examples, the access event 225 may be captured or monitored by the agent 235. The agent 235 may be embedded or associated with the host 215. For example, the agent 235 may be deployed on the host or may communicate with the host (e.g., via a connector) to receive data from the host and transmit data from the host that may be used to perform the functions of the agent 235.

The host 215, the agent 235, or both, may transmit the access event 225 (or an indication thereof) to the authentication service 220. The authentication service 220 may analyze the access event 225 to identify whether the access event 225 includes a fraudulent access event. The authentication service 220 may employ one or more machine learning models or other machine learning approaches to determine whether the access event 225 includes a fraudulent access event. In some examples, the machine learning model or other machine learning approaches may include a comparison or matching between previously authenticated browsing behavior of a user (e.g., a user associated with the tenant 210) and one or more access events 225 (e.g., previous access events associated with the user or the tenant 210).

The authentication service 220 or the agent may generate the challenge 230 to be transmitted to the tenant 210 in response to identifying a fraudulent access event 225. For example, if the authentication service 220 determines that the access event 225 is a fraudulent event, the authentication service 220 may transmit the challenge 230 to the host 215, which may, in turn, transmit the challenge 230 to the tenant 210. At such a point, the host 215 may not allow further access to the host 215 by the tenant 210 unless and/or until the tenant 210 provides a satisfactory response to the challenge 230. In some examples, the challenge 230 may be a challenge question, a request for one or more credentials, or other authentication operation that may be used to prevent unauthorized users from masquerading as authorized users.

Figure 3:
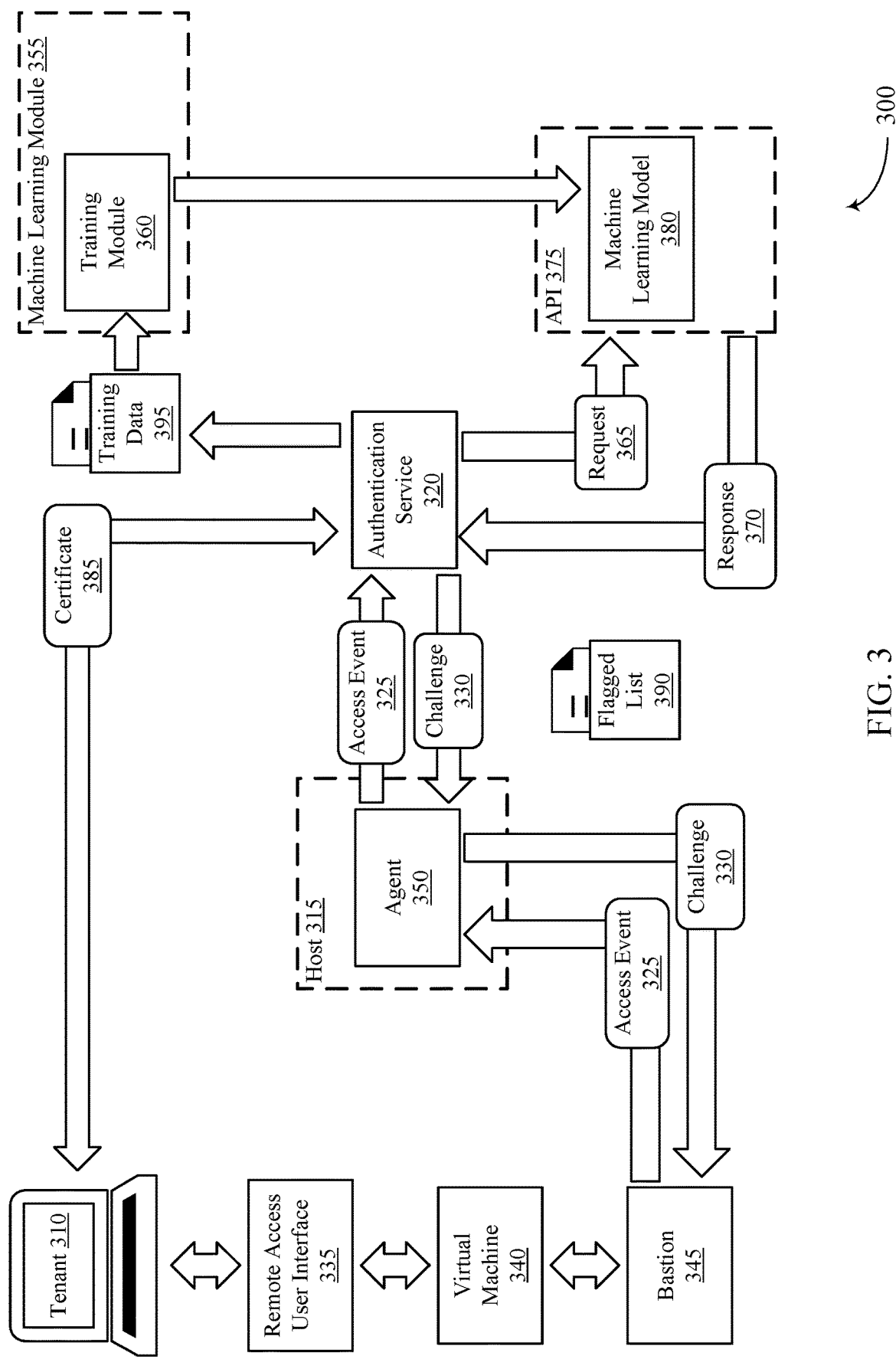
FIG. 3 shows an example of an authentication system that supports techniques for risk evaluation of access events in accordance with examples as disclosed herein.

FIG. 3 shows an example of an authentication system 300 that supports techniques for risk evaluation of access events in accordance with examples as disclosed herein.

A user associated with a tenant 310 may access a host 315 to perform a remote session to perform one or more tasks on the host 315. The tenant 310 may login via a remote access user interface 335 and a virtual machine 340 may be provisioned for the tenant 310 to access a bastion 345 through which the tenant 310 may access the host 315.

The authentication services 320 may provision a certificate 385 for the tenant 310. The authentication system 300 may bind the certificate 385 to a remote access key pair (e.g., an asymmetric key associated with the certificate 385) that is to be used to access the host 315. By binding the certificate 385 to the remote access key pair, the tenant 310 may be provided access to one or more services, programs, resources, or other elements of the host 315.

In the course of operation, the tenant 310 may initiate an access event 325. As described herein, an access event 325 may include one or more keystrokes, one or more commands, one or more operations, one or more program executions, one or more text entries, one or more other access events, or any combination thereof.

The agent 350 may monitor one or more activities, commands, keystrokes, executions, or other events occurring on the host 315 or associated with the host 315. In some examples, such monitoring may be performed irregularly, periodically, on demand, or constantly. For example, the agent 350 may monitor for one or more remote session commands (e.g., secure shell (SSH) commands) or other operations that are stored in a database or list and that may be flagged or marked as being dangerous, suspicious, or warranting further review by the authentication system 300. As such, if the agent 350 detects such commands or operations included in the access event 325, the agent 350 may forward the access event 325 or an indication thereof to the authentication service 320. In some examples, the agent 350 may transmit one or more events or keystrokes (e.g., the access event 325, other events associated with the host 315, or both) obtained from the monitoring to be stored (and optionally encoded) for both present comparisons (e.g., to determine whether the currently-captured actions are legitimate or fraudulent) and future comparisons (e.g., to be used as a basis for comparing and analyzing future actions).

In some examples, the authentication system 300 may store a user profile, user permissions, indications of one or more roles, or other information associated with users or the tenant 310. During the course of operation, the authentication system 300 may update such information associated with the user or tenant 310. Further, such information may be used as a factor for determining whether an access event 325 is fraudulent. For example, if an access event 325 corresponds with operations that would normally be performed by a user in a similar role, it may be less likely that the authentication system 300 determines that such events are fraudulent.

The authentication service 320 may transmit a request 365 to an application programming interface (API), such as the API 375. The API 375 may be a representational state transfer (REST) API or may be another type of API. The request 365 may include an indication of the access event 325, one or more elements of the access event 325 (e.g., individual or multiple keystrokes, commands, access, operations, or other events), or any combination thereof. For example, the request 365 may include one or more indications of information associated with the tenant 310, such as browsing behavior, device information or fingerprints, a locally sensitive hash, other information associated with the tenant 310, or any combination thereof. The request 365 may also explicitly request an analysis or scoring of the access event 325, one or more elements thereof, or any combination thereof.

In some examples, the authentication system 300 may determine an amount of risk associated with the access event 325 using the machine learning model 380. For example, the machine the authentication service 320 or other element of the authentication system 300 may access the machine learning model 380 via the API 375. The authentication service 320 or a processing element associated with the API 375 may analyze or score the access event 325 by performing a comparison between known behavior, commands, keystrokes, operations, executions, or other events and those captured by the agent 350 at the host 315. For The API 375 may then transmit the response 370 to the authentication service 320. The response 370) may contain an analysis, a score result, a threshold, one or more indications of a security threat level associated with the access event 325, a recommended course of action, or any combination thereof. For example, the API 375 may transmit a response 370) that includes a risk threshold and an elevated recommended outcome (e.g., compared to a baseline recommended outcome). In such a case, the response 370) may indicate a recommendation of an elevated challenge 330) that is to be transmitted to the tenant 310. Such a determination and response 370 may be determine on the basis of threshold derivatives. In such a case (and in other cases), the challenge 330) may include one or more authentication methods, such as a multi-factor authentication (MFA) process (e.g., a fast identify online (FIDO) MFA process, a one time password (OTP) authentication process, a challenge question, or other authentication process). In another example, if a risk threshold is intermediate, a recommendation may be to issue the challenge 330 to the tenant 310, the challenge 330) including an authentication method that may be different than an authentication method associated with an elevated risk threshold. In another example, if a risk threshold is low, the recommendation may be to not issue a challenge. However, in some or all scenarios involving the subject matter disclosed herein, some or all actions, events, identities, or other information may be logged for further analysis or training of the machine learning model 380).

The machine learning model 380 may be trained using the training module 360 of the machine learning module 355 using the training data 395. The training data 395 may include examples of legitimate behavior, suspicious behavior, dangerous behavior, illegitimate behavior, other information related to authentication practices, or any combination thereof, any or all of which may include example keystrokes, commands, operations, executions, context, or other information that may be tagged or marked to aid in training the machine learning model 380.

In some examples, the agent 350, the API 375, a processing element associated with the API 375, another element of the authentication system 300, or any combination thereof, may access a list (e.g., the flagged list 390) or other container of keystrokes, commands, operations, executions, context, or other information that may be marked, flagged, or indicated as being suspicious or fraudulent. The agent 350, the API 375, a processing element associated with the API 375, another element of the authentication system 300, or any combination thereof, may compare one or more elements of the access event 325 to one or more elements of the flagged list 390. If one or more of the elements of the access event 325 match one or more elements of the flagged list 390, the agent 350, the API 375, a processing element associated with the API 375, another element of the authentication system 300, or any combination thereof may determine that the access event is fraudulent or suspicious and may issue the challenge 330 to the tenant 310.

Figure 4:
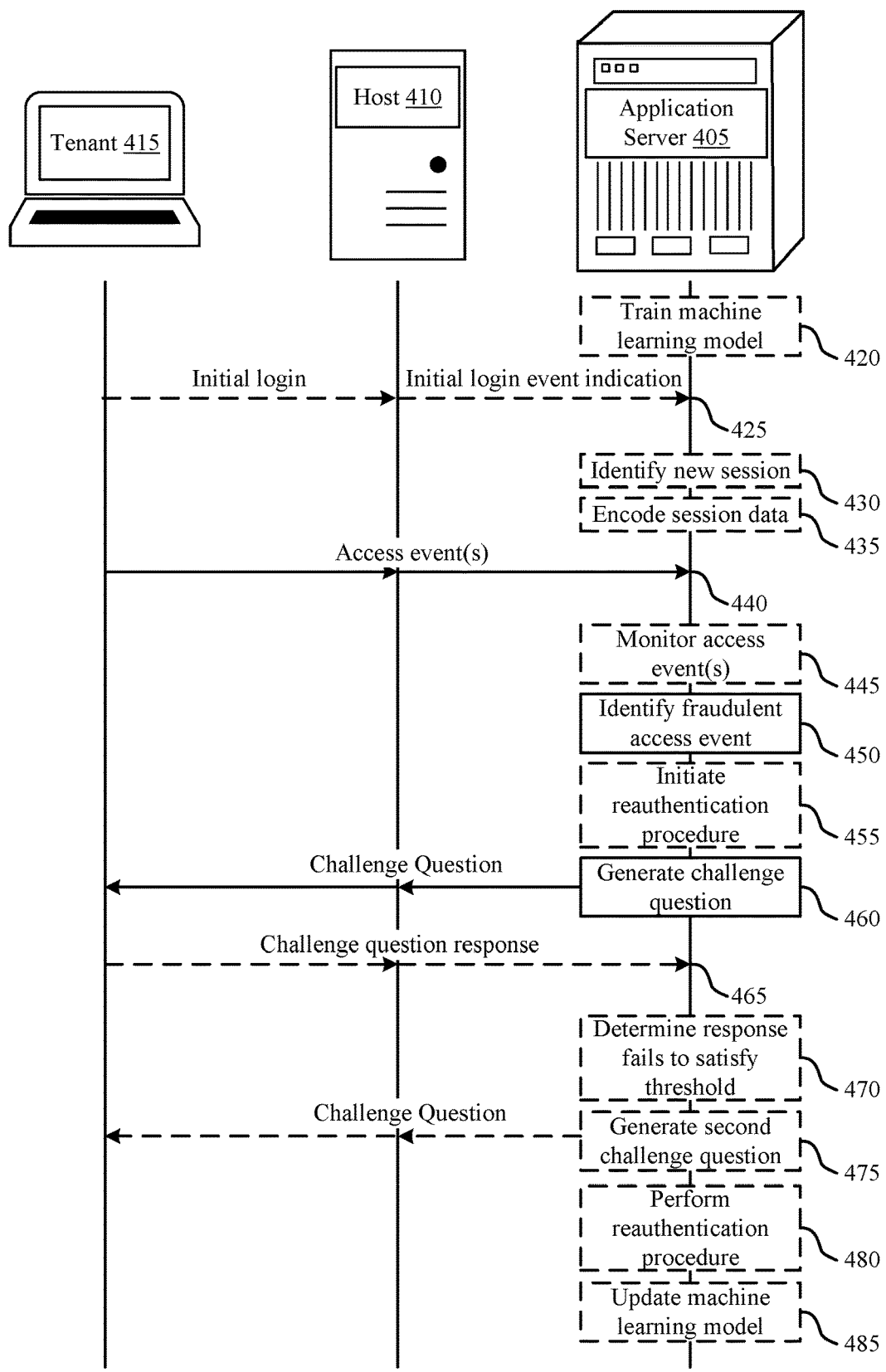
FIG. 4 shows an example of a process flow that supports techniques for risk evaluation of access events in accordance with examples as disclosed herein.

FIG. 4 shows an example of a process flow 400 that supports techniques for risk evaluation of access events in accordance with examples as disclosed herein. The process flow 400 may implement various aspects of the present disclosure described herein. The elements described in the process flow 400 (e.g., application server 405, host platform 410, and tenant 415) may be examples of similarly-named elements described herein.

In the following description of the process flow 400, the operations between the various entities or elements may be performed in different orders or at different times. Some operations may also be left out of the process flow 400, or other operations may be added. Although the various entities or elements are shown performing the operations of the process flow 400, some aspects of some operations may also be performed by other entities or elements of the process flow 400 or by entities or elements that are not depicted in the process flow, or any combination thereof.

At 420, the application server 405 may train the machine learning model with a list of known fraudulent access events, a list of known authenticated browsing behaviors, and the previously authenticated browsing behavior of the user.

At 425, the application server 405 may receive, from the host platform 410, an indication of an initial login authorization event prior to an occurrence of the one or more access events and the initial login authorization event corresponds to a first authorization method. In some examples, the first authorization method may include one or more of a password authentication, a fingerprint authentication, a face recognition authentication, or a combination thereof.

At 430, the application server 405 may identify initiation of a new session at the host platform 410 based on receiving the one or more access events from the user of the host platform 410 associated with the tenant 415 of the plurality of tenants.

At 435, the application server 405 may encode session data corresponding to the new session at the host platform 410 and identifying the at least one fraudulent access event is based on executing the machine learning model on the encoded session data.

At 440, the application server 405 may receive, via a cloud-based platform supporting a plurality of tenants, one or more access events from a user of a host platform 410 associated with a tenant 415 of the plurality of tenants, the one or more access events that may include one or more keystroke events at the host platform 410 and one or more commands inputted by the user at the host platform 410 and the one or more access events are captured by a continuous authentication agent associated with the host platform 410. In some examples, the one or more keystroke events comprise one or more secure socket shell keystroke events.

At 445, the application server 405 may monitor the one or more access events for fraudulent access events in response to receiving the indication of the initial login authorization event.

At 450, the application server 405 may identify at least one fraudulent access event based on executing a machine learning model to perform a pattern matching between previously authenticated browsing behavior of the user and the one or more access events at the host platform 410. In some examples, the at least one fraudulent access event may include at least one of a suspicious command, a suspicious pattern of keystrokes, or a combination thereof.

At 455, the application server 405 may initiate a reauthentication procedure based on identifying the at least one fraudulent access event and the reauthentication procedure may include generating the challenge question for reauthenticating the user.

At 460, the application server 405 may generate a challenge question for reauthenticating the user of the host platform 410 based on identifying the at least one fraudulent access event. In some examples, the challenge question corresponds to a second authorization method different from the first authorization method.

At 465, the application server 405 may receive a response to the challenge question from the user of the host platform 410.

At 470, the application server 405 may determine that the response to the challenge question fails to satisfy an authentication threshold.

At 475, the application server 405 may generate a second challenge question based on the response to the challenge question failing to satisfy the authentication threshold.

At 480, the application server 405 may perform a reauthentication procedure of the user of the host platform 410 based on receiving the response to the challenge question.

At 485, the application server 405 may update the machine learning model based on performing the reauthentication procedure of the user.

Figure 5:
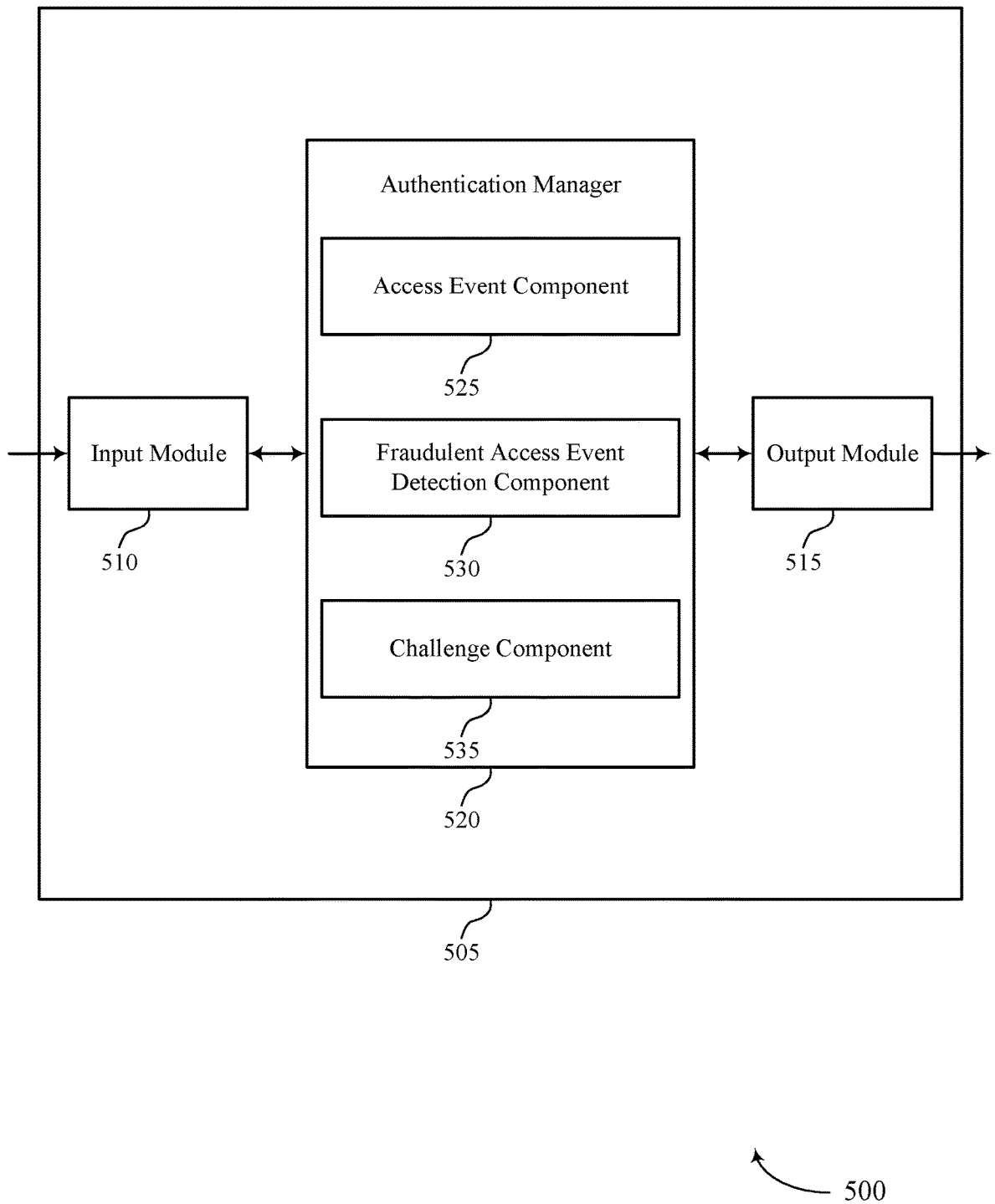
FIG. 5 shows a block diagram of an apparatus that supports techniques for risk evaluation of access events in accordance with examples as disclosed herein.

FIG. 5 shows a block diagram 500 of a device 505 that supports techniques for risk evaluation of access events in accordance with examples as disclosed herein. The device 505 may include an input module 510, an output module 515, and an authentication manager 520. The device 505, or one or more components of the device 505 (e.g., the input module 510, the output module 515, and the authentication manager 520), may include at least one processor, which may be coupled with at least one memory, to support the described techniques. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the {PRIMARY_MODULE} 520 to support techniques for risk evaluation of access events. In some cases, the input module 510 may be a component of an I/O controller 710 as described with reference to FIG. 7.

The output module 515 may manage output signals for the device 505. For example, the output module 515 may receive signals from other components of the device 505, such as the {PRIMARY_MODULE} 520, and may transmit these signals to other components or devices. In some examples, the output module 515 may transmit output signals for display in a user interface, for storage in a database or data store, for further processing at a server or server cluster, or for any other processes at any quantity of devices or systems. In some cases, the output module 515 may be a component of an I/O controller 710 as described with reference to FIG. 7.

For example, the authentication manager 520 may include an access event component 525, a fraudulent access event detection component 530, a challenge component 535, or any combination thereof. In some examples, the authentication manager 520, or various components thereof, may be configured to perform various operations (e.g., receiving, monitoring, transmitting) using or otherwise in cooperation with the input module 510, the output module 515, or both. For example, the authentication manager 520 may receive information from the input module 510, send information to the output module 515, or be integrated in combination with the input module 510, the output module 515, or both to receive information, transmit information, or perform various other operations as described herein.

The authentication manager 520 may support data processing in accordance with examples as disclosed herein. The access event component 525 may be configured as or otherwise support a means for receiving, via a cloud-based platform supporting a set of multiple tenants, one or more access events from a user of a host platform associated with a tenant of the set of multiple tenants, the one or more access events including one or more keystroke events at the host platform and one or more commands inputted by the user at the host platform, where the one or more access events are captured by a continuous authentication agent associated with the host platform. The fraudulent access event detection component 530 may be configured as or otherwise support a means for identifying at least one fraudulent access event based on executing a machine learning model to perform a pattern matching between previously authenticated browsing behavior of the user and the one or more access events at the host platform. The challenge component 535 may be configured as or otherwise support a means for generating a challenge question for reauthenticating the user of the host platform based on identifying the at least one fraudulent access event.

Figure 6:
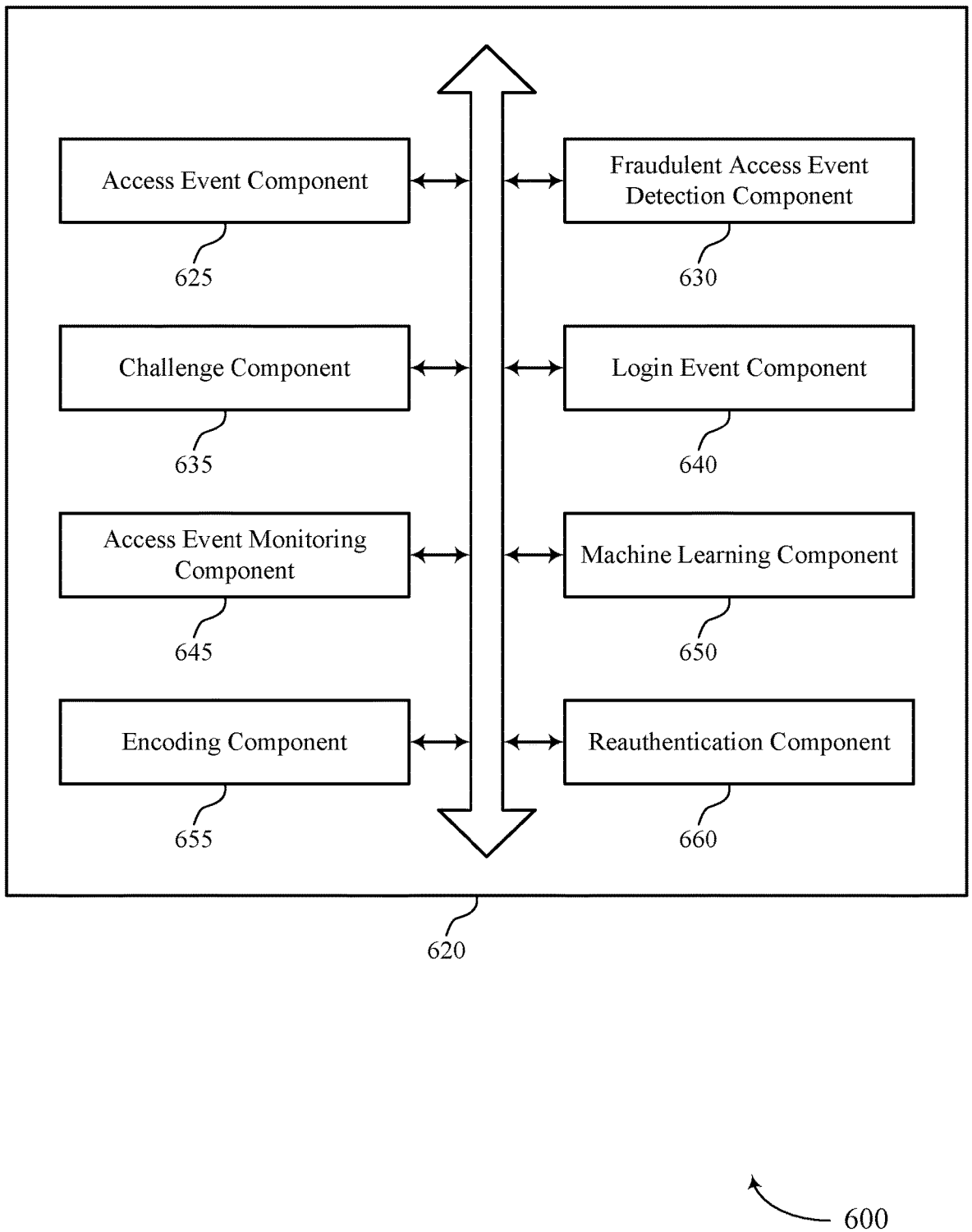
FIG. 6 shows a block diagram of an authentication manager that supports techniques for risk evaluation of access events in accordance with examples as disclosed herein.

FIG. 6 shows a block diagram 600 of an authentication manager 620 that supports techniques for risk evaluation of access events in accordance with examples as disclosed herein. The authentication manager 620) may be an example of aspects of an authentication manager or an authentication manager 520, or both, as described herein. The authentication manager 620, or various components thereof, may be an example of means for performing various aspects of techniques for risk evaluation of access events as described herein. For example, the authentication manager 620 may include an access event component 625, a fraudulent access event detection component 630, a challenge component 635, a login event component 640, an access event monitoring component 645, a machine learning component 650, an encoding component 655, a reauthentication component 660, or any combination thereof. Each of these components, or components of subcomponents thereof (e.g., one or more processors, one or more memories), may communicate, directly or indirectly, with one another (e.g., via one or more buses).

The authentication manager 620 may support data processing in accordance with examples as disclosed herein. The access event component 625 may be configured as or otherwise support a means for receiving, via a cloud-based platform supporting a set of multiple tenants, one or more access events from a user of a host platform associated with a tenant of the set of multiple tenants, the one or more access events including one or more keystroke events at the host platform and one or more commands inputted by the user at the host platform, where the one or more access events are captured by a continuous authentication agent associated with the host platform. The fraudulent access event detection component 630 may be configured as or otherwise support a means for identifying at least one fraudulent access event based on executing a machine learning model to perform a pattern matching between previously authenticated browsing behavior of the user and the one or more access events at the host platform. The challenge component 635 may be configured as or otherwise support a means for generating a challenge question for reauthenticating the user of the host platform based on identifying the at least one fraudulent access event.

In some examples, the login event component 640 may be configured as or otherwise support a means for receiving, from the host platform, an indication of an initial login authorization event prior to an occurrence of the one or more access events, where the initial login authorization event corresponds to a first authorization method. In some examples, the access event monitoring component 645 may be configured as or otherwise support a means for monitoring the one or more access events for fraudulent access events in response to receiving the indication of the initial login authorization event.

In some examples, the reauthentication component 660 may be configured as or otherwise support a means for initiating a reauthentication procedure based on identifying the at least one fraudulent access event, where the reauthentication procedure includes generating the challenge question for reauthenticating the user.

In some examples, the challenge question corresponds to a second authorization method different from the first authorization method.

In some examples, the first authorization method includes one or more of a password authentication, a fingerprint authentication, a face recognition authentication, or a combination thereof.

In some examples, the machine learning component 650 may be configured as or otherwise support a means for training the machine learning model with a list of known fraudulent access events, a list of known authenticated browsing behaviors, and the previously authenticated browsing behavior of the user.

In some examples, the access event monitoring component 645 may be configured as or otherwise support a means for identifying initiation of a new session at the host platform based on receiving the one or more access events from the user of the host platform associated with the tenant of the set of multiple tenants. In some examples, the encoding component 655 may be configured as or otherwise support a means for encoding session data corresponding to the new session at the host platform, where identifying the at least one fraudulent access event is based on executing the machine learning model on the encoded session data.

In some examples, the challenge component 635 may be configured as or otherwise support a means for receiving a response to the challenge question from the user of the host platform. In some examples, the reauthentication component 660 may be configured as or otherwise support a means for performing a reauthentication procedure of the user of the host platform based on receiving the response to the challenge question. In some examples, the machine learning component 650 may be configured as or otherwise support a means for updating the machine learning model based on performing the reauthentication procedure of the user.

In some examples, the challenge component 635 may be configured as or otherwise support a means for determining that the response to the challenge question fails to satisfy an authentication threshold. In some examples, the challenge component 635 may be configured as or otherwise support a means for generating a second challenge question based on the response to the challenge question failing to satisfy the authentication threshold.

In some examples, the one or more keystroke events include one or more secure socket shell keystroke events.

In some examples, the at least one fraudulent access event includes at least one of a suspicious command, a suspicious pattern of keystrokes, or a combination thereof.

Figure 7:
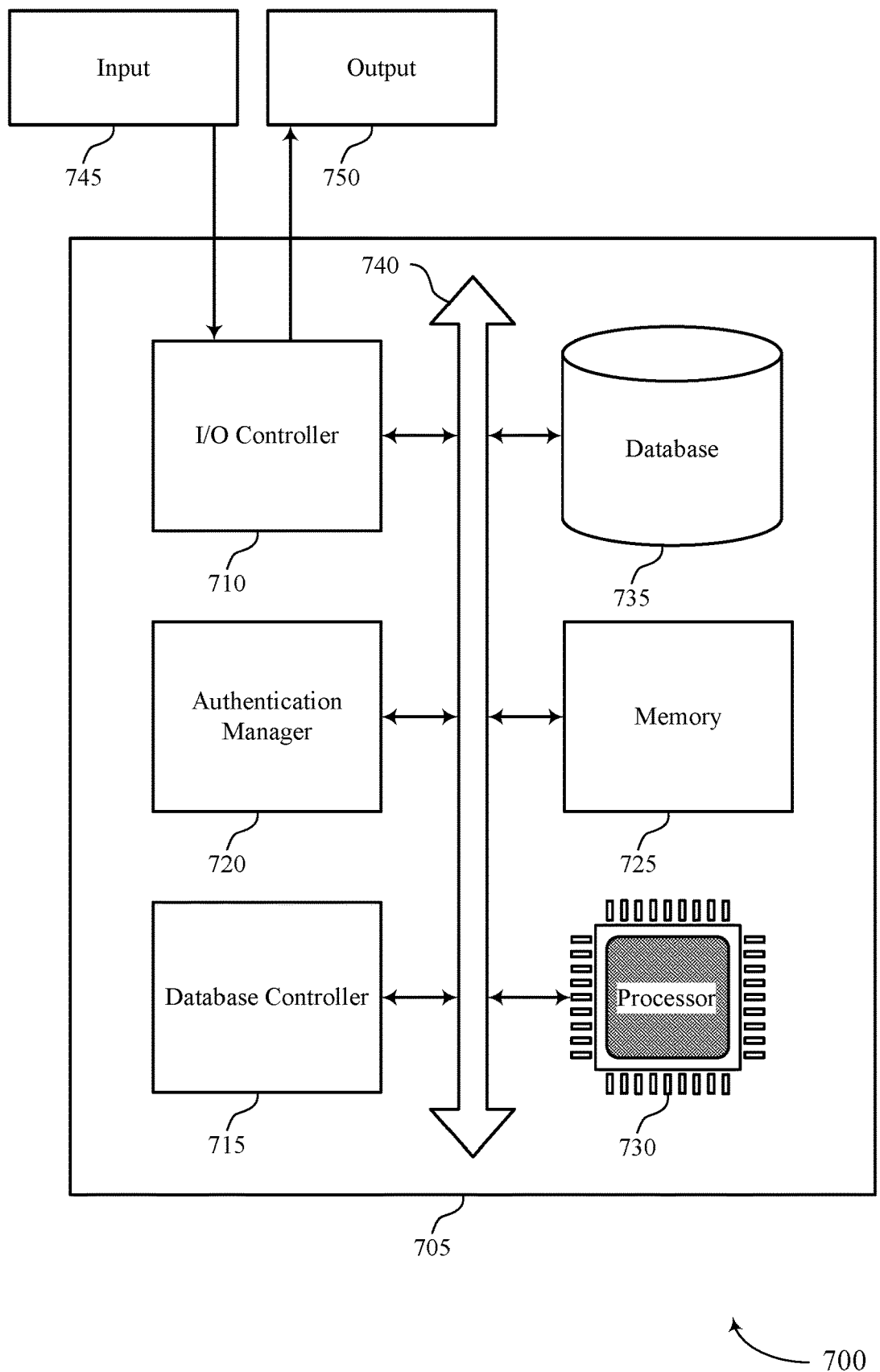
FIG. 7 shows a diagram of a system including a device that supports techniques for risk evaluation of access events in accordance with examples as disclosed herein.

FIG. 7 shows a diagram of a system 700 including a device 705 that supports techniques for risk evaluation of access events in accordance with examples as disclosed herein. The device 705 may be an example of or include the components of a device 505 as described herein. The device 705 may include components for bi-directional data communications including components for transmitting and receiving communications, such as an authentication manager 720, an I/O controller 710, a database controller 715, at least one memory 725, at least one processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and ROM. The memory 725 may store computer-readable, computer-executable software including instructions that, when executed, cause at least one processor 730 to perform various functions described herein. In some cases, the memory 725 may contain, among other things, a BIOS which may control basic hardware or software operation such as the interaction with peripheral components or devices. The memory 725 may be an example of a single memory or multiple memories. For example, the device 705 may include one or more memories 725.

The processor 730 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in at least one memory 725 to perform various functions (e.g., functions or tasks supporting techniques for risk evaluation of access events). The processor 730 may be an example of a single processor or multiple processors. For example, the device 705 may include one or more processors.

The authentication manager 720 may support data processing in accordance with examples as disclosed herein. For example, the authentication manager 720 may be configured as or otherwise support a means for receiving, via a cloud-based platform supporting a set of multiple tenants, one or more access events from a user of a host platform associated with a tenant of the set of multiple tenants, the one or more access events including one or more keystroke events at the host platform and one or more commands inputted by the user at the host platform, where the one or more access events are captured by a continuous authentication agent associated with the host platform. The authentication manager 720 may be configured as or otherwise support a means for identifying at least one fraudulent access event based on executing a machine learning model to perform a pattern matching between previously authenticated browsing behavior of the user and the one or more access events at the host platform. The authentication manager 720 may be configured as or otherwise support a means for generating a challenge question for reauthenticating the user of the host platform based on identifying the at least one fraudulent access event.

By including or configuring the authentication manager 720 in accordance with examples as described herein, the device 705 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

Figure 8:
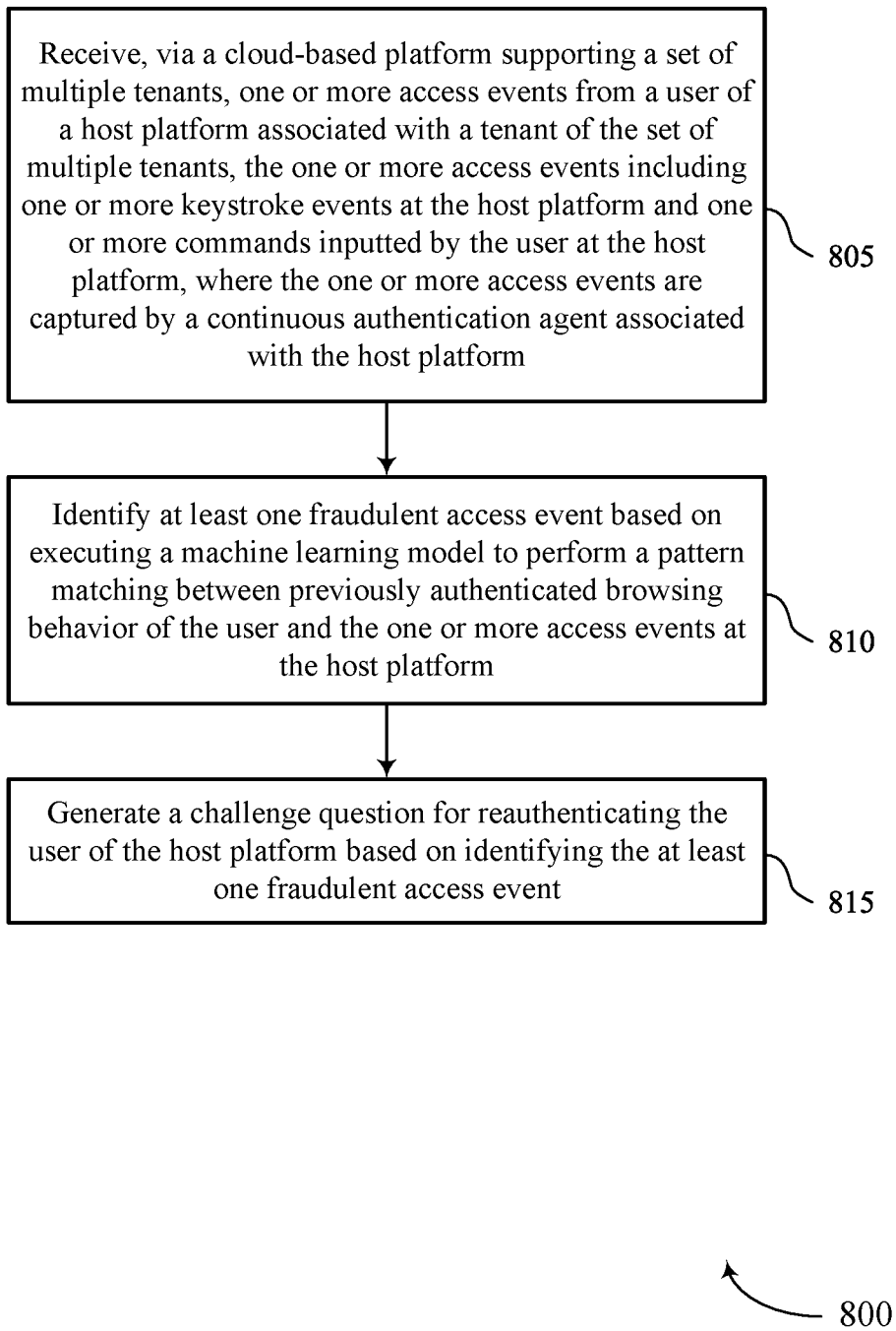
FIGS. 8 and 9 show flowcharts illustrating methods that support techniques for risk evaluation of access events in accordance with examples as disclosed herein.

FIG. 8 shows a flowchart illustrating a method 800 that supports techniques for risk evaluation of access events in accordance with examples as disclosed herein. The operations of the method 800 may be implemented by an application server or its components as described herein. For example, the operations of the method 800 may be performed by an application server as described with reference to FIGS. 1 through 7. In some examples, an application server may execute a set of instructions to control the functional elements of the application server to perform the described functions. Additionally, or alternatively, the application server may perform aspects of the described functions using special-purpose hardware.

At 805, the method may include receiving, via a cloud-based platform supporting a set of multiple tenants, one or more access events from a user of a host platform associated with a tenant of the set of multiple tenants, the one or more access events including one or more keystroke events at the host platform and one or more commands inputted by the user at the host platform, where the one or more access events are captured by a continuous authentication agent associated with the host platform. The operations of block 805 may be performed in accordance with examples as disclosed herein. In some examples, aspects of the operations of 805 may be performed by an access event component 625 as described with reference to FIG. 6.

At 810, the method may include identifying at least one fraudulent access event based on executing a machine learning model to perform a pattern matching between previously authenticated browsing behavior of the user and the one or more access events at the host platform. The operations of block 810 may be performed in accordance with examples as disclosed herein. In some examples, aspects of the operations of 810 may be performed by a fraudulent access event detection component 630 as described with reference to FIG. 6.

At 815, the method may include generating a challenge question for reauthenticating the user of the host platform based on identifying the at least one fraudulent access event. The operations of block 815 may be performed in accordance with examples as disclosed herein. In some examples, aspects of the operations of 815 may be performed by a challenge component 635 as described with reference to FIG. 6.

Figure 9:
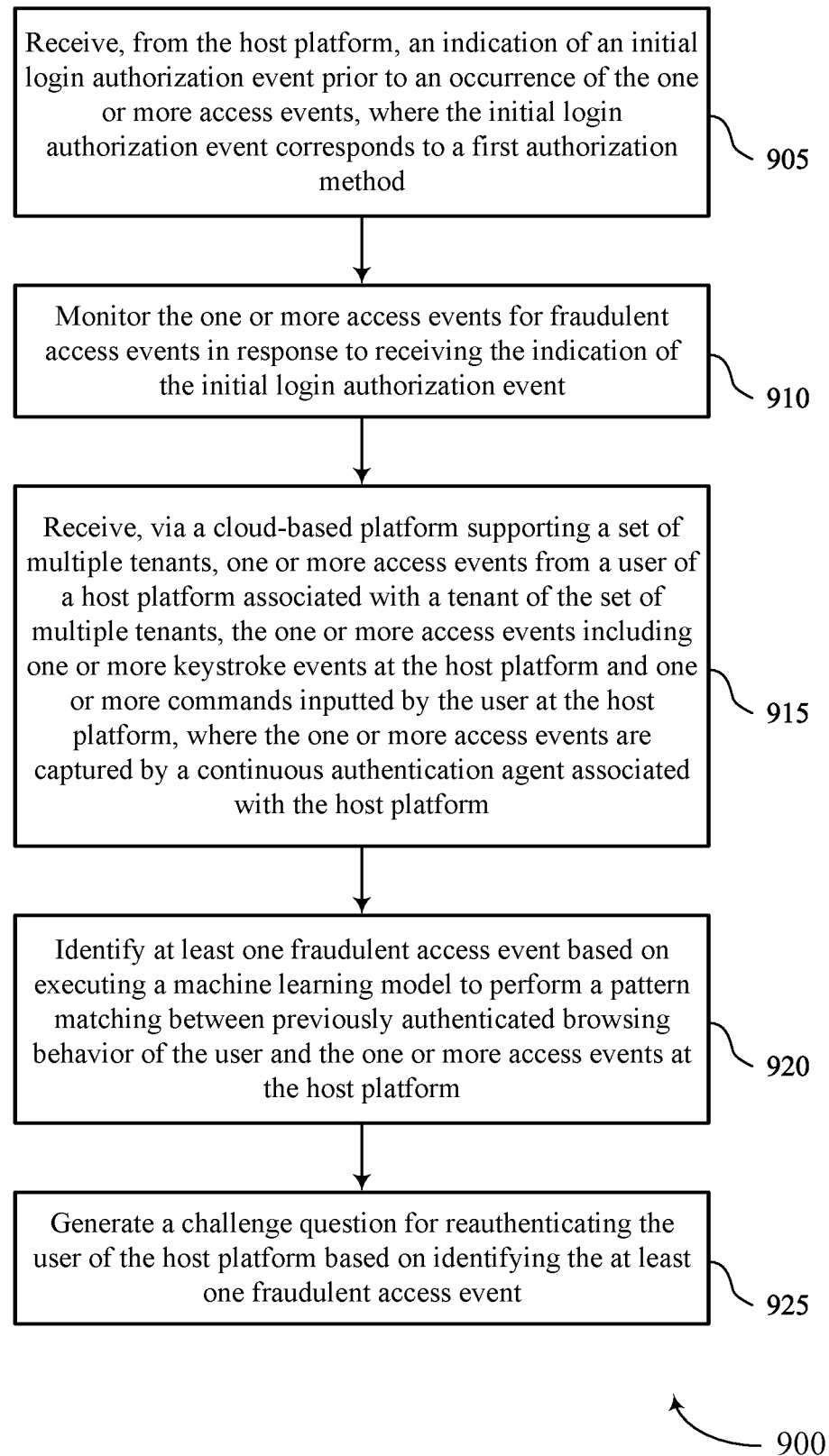

FIG. 9 shows a flowchart illustrating a method 900 that supports techniques for risk evaluation of access events in accordance with examples as disclosed herein. The operations of the method 900 may be implemented by an application server or its components as described herein. For example, the operations of the method 900 may be performed by an application server as described with reference to FIGS. 1 through 7. In some examples, an application server may execute a set of instructions to control the functional elements of the application server to perform the described functions. Additionally, or alternatively, the application server may perform aspects of the described functions using special-purpose hardware.

At 905, the method may include receiving, from the host platform, an indication of an initial login authorization event prior to an occurrence of the one or more access events, where the initial login authorization event corresponds to a first authorization method. The operations of block 905 may be performed in accordance with examples as disclosed herein. In some examples, aspects of the operations of 905 may be performed by a login event component 640 as described with reference to FIG. 6.

At 910, the method may include monitoring the one or more access events for fraudulent access events in response to receiving the indication of the initial login authorization event. The operations of block 910 may be performed in accordance with examples as disclosed herein. In some examples, aspects of the operations of 910 may be performed by an access event monitoring component 645 as described with reference to FIG. 6.

At 915, the method may include receiving, via a cloud-based platform supporting a set of multiple tenants, one or more access events from a user of a host platform associated with a tenant of the set of multiple tenants, the one or more access events including one or more keystroke events at the host platform and one or more commands inputted by the user at the host platform, where the one or more access events are captured by a continuous authentication agent associated with the host platform. The operations of block 915 may be performed in accordance with examples as disclosed herein. In some examples, aspects of the operations of 915 may be performed by an access event component 625 as described with reference to FIG. 6.

At 920, the method may include identifying at least one fraudulent access event based on executing a machine learning model to perform a pattern matching between previously authenticated browsing behavior of the user and the one or more access events at the host platform. The operations of block 920 may be performed in accordance with examples as disclosed herein. In some examples, aspects of the operations of 920 may be performed by a fraudulent access event detection component 630 as described with reference to FIG. 6.

At 925, the method may include generating a challenge question for reauthenticating the user of the host platform based on identifying the at least one fraudulent access event. The operations of block 925 may be performed in accordance with examples as disclosed herein. In some examples, aspects of the operations of 925 may be performed by a challenge component 635 as described with reference to FIG. 6.

A method for data processing is described. The method may include receiving, via a cloud-based platform supporting a set of multiple tenants, one or more access events from a user of a host platform associated with a tenant of the set of multiple tenants, the one or more access events including one or more keystroke events at the host platform and one or more commands inputted by the user at the host platform, where the one or more access events are captured by a continuous authentication agent associated with the host platform, identifying at least one fraudulent access event based on executing a machine learning model to perform a pattern matching between previously authenticated browsing behavior of the user and the one or more access events at the host platform, and generating a challenge question for reauthenticating the user of the host platform based on identifying the at least one fraudulent access event.

An apparatus for data processing is described. The apparatus may include at least one processor, at least one memory coupled with the at least one processor, and instructions stored in the at least one memory. The instructions may be executable by the at least one processor to cause the apparatus to receive, via a cloud-based platform supporting a set of multiple tenants, one or more access events from a user of a host platform associated with a tenant of the set of multiple tenants, the one or more access events including one or more keystroke events at the host platform and one or more commands inputted by the user at the host platform, where the one or more access events are captured by a continuous authentication agent associated with the host platform, identify at least one fraudulent access event based on executing a machine learning model to perform a pattern matching between previously authenticated browsing behavior of the user and the one or more access events at the host platform, and generate a challenge question for reauthenticating the user of the host platform based on identifying the at least one fraudulent access event.

Another apparatus for data processing is described. The apparatus may include means for receiving, via a cloud-based platform supporting a set of multiple tenants, one or more access events from a user of a host platform associated with a tenant of the set of multiple tenants, the one or more access events including one or more keystroke events at the host platform and one or more commands inputted by the user at the host platform, where the one or more access events are captured by a continuous authentication agent associated with the host platform, means for identifying at least one fraudulent access event based on executing a machine learning model to perform a pattern matching between previously authenticated browsing behavior of the user and the one or more access events at the host platform, and means for generating a challenge question for reauthenticating the user of the host platform based on identifying the at least one fraudulent access event.

A non-transitory computer-readable medium storing code for data processing is described. The code may include instructions executable by a processor to receive, via a cloud-based platform supporting a set of multiple tenants, one or more access events from a user of a host platform associated with a tenant of the set of multiple tenants, the one or more access events including one or more keystroke events at the host platform and one or more commands inputted by the user at the host platform, where the one or more access events are captured by a continuous authentication agent associated with the host platform, identify at least one fraudulent access event based on executing a machine learning model to perform a pattern matching between previously authenticated browsing behavior of the user and the one or more access events at the host platform, and generate a challenge question for reauthenticating the user of the host platform based on identifying the at least one fraudulent access event.

Some examples of the method, apparatuses, and non-transitory computer-readable medium described herein may further include operations, features, means, or instructions for receiving, from the host platform, an indication of an initial login authorization event prior to an occurrence of the one or more access events, where the initial login authorization event corresponds to a first authorization method and monitoring the one or more access events for fraudulent access events in response to receiving the indication of the initial login authorization event.

Some examples of the method, apparatuses, and non-transitory computer-readable medium described herein may further include operations, features, means, or instructions for initiating a reauthentication procedure based on identifying the at least one fraudulent access event, where the reauthentication procedure includes generating the challenge question for reauthenticating the user.

In some examples of the method, apparatuses, and non-transitory computer-readable medium described herein, the challenge question corresponds to a second authorization method different from the first authorization method.

In some examples of the method, apparatuses, and non-transitory computer-readable medium described herein, the first authorization method includes one or more of a password authentication, a fingerprint authentication, a face recognition authentication, or a combination thereof.

Some examples of the method, apparatuses, and non-transitory computer-readable medium described herein may further include operations, features, means, or instructions for training the machine learning model with a list of known fraudulent access events, a list of known authenticated browsing behaviors, and the previously authenticated browsing behavior of the user.

Some examples of the method, apparatuses, and non-transitory computer-readable medium described herein may further include operations, features, means, or instructions for identifying initiation of a new session at the host platform based on receiving the one or more access events from the user of the host platform associated with the tenant of the set of multiple tenants and encoding session data corresponding to the new session at the host platform, where identifying the at least one fraudulent access event may be based on executing the machine learning model on the encoded session data.

Some examples of the method, apparatuses, and non-transitory computer-readable medium described herein may further include operations, features, means, or instructions for receiving a response to the challenge question from the user of the host platform, performing a reauthentication procedure of the user of the host platform based on receiving the response to the challenge question, and updating the machine learning model based on performing the reauthentication procedure of the user.

Some examples of the method, apparatuses, and non-transitory computer-readable medium described herein may further include operations, features, means, or instructions for determining that the response to the challenge question fails to satisfy an authentication threshold and generating a second challenge question based on the response to the challenge question failing to satisfy the authentication threshold.

In some examples of the method, apparatuses, and non-transitory computer-readable medium described herein, the one or more keystroke events include one or more secure socket shell keystroke events.

In some examples of the method, apparatuses, and non-transitory computer-readable medium described herein, the at least one fraudulent access event includes at least one of a suspicious command, a suspicious pattern of keystrokes, or a combination thereof.

The following provides an overview of aspects of the present disclosure:

Aspect 1: A method for data processing, comprising: receiving, via a cloud-based platform supporting a plurality of tenants, one or more access events from a user of a host platform associated with a tenant of the plurality of tenants, the one or more access events comprising one or more keystroke events at the host platform and one or more commands inputted by the user at the host platform, wherein the one or more access events are captured by a continuous authentication agent associated with the host platform; identifying at least one fraudulent access event based at least in part on executing a machine learning model to perform a pattern matching between previously authenticated browsing behavior of the user and the one or more access events at the host platform; and generating a challenge question for reauthenticating the user of the host platform based at least in part on identifying the at least one fraudulent access event.

Aspect 2: The method of aspect 1, further comprising: receiving, from the host platform, an indication of an initial login authorization event prior to an occurrence of the one or more access events, wherein the initial login authorization event corresponds to a first authorization method; and monitoring the one or more access events for fraudulent access events in response to receiving the indication of the initial login authorization event.

Aspect 3: The method of aspect 2, further comprising: initiating a reauthentication procedure based at least in part on identifying the at least one fraudulent access event, wherein the reauthentication procedure comprises generating the challenge question for reauthenticating the user.

Aspect 4: The method of any of aspects 2 through 3, wherein the challenge question corresponds to a second authorization method different from the first authorization method.

Aspect 5: The method of any of aspects 2 through 4, wherein the first authorization method comprises one or more of a password authentication, a fingerprint authentication, a face recognition authentication, or a combination thereof.

Aspect 6: The method of any of aspects 1 through 5, further comprising: training the machine learning model with a list of known fraudulent access events, a list of known authenticated browsing behaviors, and the previously authenticated browsing behavior of the user.

Aspect 7: The method of any of aspects 1 through 6, further comprising: identifying initiation of a new session at the host platform based at least in part on receiving the one or more access events from the user of the host platform associated with the tenant of the plurality of tenants; and encoding session data corresponding to the new session at the host platform, wherein identifying the at least one fraudulent access event is based at least in part on executing the machine learning model on the encoded session data.

Aspect 8: The method of any of aspects 1 through 7, further comprising: receiving a response to the challenge question from the user of the host platform; performing a reauthentication procedure of the user of the host platform based at least in part on receiving the response to the challenge question; and updating the machine learning model based at least in part on performing the reauthentication procedure of the user.

Aspect 9: The method of aspect 8, further comprising: determining that the response to the challenge question fails to satisfy an authentication threshold; and generating a second challenge question based at least in part on the response to the challenge question failing to satisfy the authentication threshold.

Aspect 10: The method of any of aspects 1 through 9, wherein the one or more keystroke events comprise one or more secure socket shell keystroke events.

Aspect 11: The method of any of aspects 1 through 10, wherein the at least one fraudulent access event comprises at least one of a suspicious command, a suspicious pattern of keystrokes, or a combination thereof.

Aspect 12: An apparatus for data processing, comprising at least one processor; at least one memory coupled with the at least one processor; and instructions stored in the at least one memory and executable by the at least one processor to cause the apparatus to perform a method of any of aspects 1 through 11.

Aspect 13: An apparatus for data processing, comprising at least one means for performing a method of any of aspects 1 through 11.

Aspect 14: A non-transitory computer-readable medium storing code for data processing, the code comprising instructions executable by a processor to perform a method of any of aspects 1 through 11.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
   receiving, via a cloud-based platform supporting a plurality of tenants, one or more access events from a user of a host platform associated with a tenant of the plurality of tenants, the one or more access events comprising one or more keystroke events at the host platform and one or more commands inputted by the user at the host platform, wherein the one or more access events are captured by a continuous authentication agent associated with the host platform;
   training a machine learning model with a list of known fraudulent access events, a list of known authenticated browsing behaviors, and previously authenticated browsing behavior of the user;
   identifying at least one fraudulent access event based at least in part on executing the machine learning model to perform a pattern matching between the previously authenticated browsing behavior of the user and the one or more access events at the host platform; and
   generating a challenge question for reauthenticating the user of the host platform based at least in part on identifying the at least one fraudulent access event.

2. The method of claim 1, further comprising:
   receiving, from the host platform, an indication of an initial login authorization event prior to an occurrence of the one or more access events, wherein the initial login authorization event corresponds to a first authorization method; and
   monitoring the one or more access events for fraudulent access events in response to receiving the indication of the initial login authorization event.

3. The method of claim 2, further comprising:
   initiating a reauthentication procedure based at least in part on identifying the at least one fraudulent access event, wherein the reauthentication procedure comprises generating the challenge question for reauthenticating the user.

4. The method of claim 2, wherein the challenge question corresponds to a second authorization method different from the first authorization method.

5. The method of claim 2, wherein the first authorization method comprises one or more of a password authentication, a fingerprint authentication, a face recognition authentication, or a combination thereof.

6. The method of claim 1, further comprising:
   identifying initiation of a new session at the host platform based at least in part on receiving the one or more access events from the user of the host platform associated with the tenant of the plurality of tenants; and
   encoding session data corresponding to the new session at the host platform, wherein identifying the at least one fraudulent access event is based at least in part on executing the machine learning model on the encoded session data.

7. The method of claim 1, further comprising:
   receiving a response to the challenge question from the user of the host platform;

performing a reauthentication procedure of the user of the host platform based at least in part on receiving the response to the challenge question; and updating the machine learning model based at least in part on performing the reauthentication procedure of the user.

8. The method of claim 7, further comprising:

determining that the response to the challenge question fails to satisfy an authentication threshold; and generating a second challenge question based at least in part on the response to the challenge question failing to satisfy the authentication threshold.

9. The method of claim 1, wherein the one or more keystroke events comprise one or more secure socket shell keystroke events.

10. The method of claim 1, wherein the at least one fraudulent access event comprises at least one of a suspicious command, a suspicious pattern of keystrokes, or a combination thereof.

11. An apparatus for data processing, comprising:

at least one processor;

at least one memory coupled with the at least one processor; and instructions stored in the at least one memory and executable by the at least one processor to cause the apparatus to:

receive, via a cloud-based platform supporting a plurality of tenants, one or more access events from a user of a host platform associated with a tenant of the plurality of tenants, the one or more access events comprising one or more keystroke events at the host platform and one or more commands inputted by the user at the host platform, wherein the one or more access events are captured by a continuous authentication agent associated with the host platform;

train a machine learning model with a list of known fraudulent access events, a list of known authenticated browsing behaviors, and previously authenticated browsing behavior of the user;

identify at least one fraudulent access event based at least in part on executing the machine learning model to perform a pattern matching between the previously authenticated browsing behavior of the user and the one or more access events at the host platform; and generate a challenge question for reauthenticating the user of the host platform based at least in part on identifying the at least one fraudulent access event.

12. The apparatus of claim 11, wherein the instructions are further executable by the at least one processor to cause the apparatus to:

receive, from the host platform, an indication of an initial login authorization event prior to an occurrence of the one or more access events, wherein the initial login authorization event corresponds to a first authorization method; and monitor the one or more access events for fraudulent access events in response to receiving the indication of the initial login authorization event.

13. The apparatus of claim 12, wherein the instructions are further executable by the at least one processor to cause the apparatus to:

initiate a reauthentication procedure based at least in part on identifying the at least one fraudulent access event, wherein the reauthentication procedure comprises generating the challenge question for reauthenticating the user.

14. The apparatus of claim 12, wherein the challenge question corresponds to a second authorization method different from the first authorization method.

15. The apparatus of claim 12, wherein the first authorization method comprises one or more of a password authentication, a fingerprint authentication, a face recognition authentication, or a combination thereof.

16. The apparatus of claim 11, wherein the instructions are further executable by the at least one processor to cause the apparatus to:

identify initiation of a new session at the host platform based at least in part on receiving the one or more access events from the user of the host platform associated with the tenant of the plurality of tenants; and encode session data corresponding to the new session at the host platform, wherein identifying the at least one fraudulent access event is based at least in part on executing the machine learning model on the encoded session data.

17. A non-transitory computer-readable medium storing code for data processing, the code comprising instructions executable by at least one processor to:

receive, via a cloud-based platform supporting a plurality of tenants, one or more access events from a user of a host platform associated with a tenant of the plurality of tenants, the one or more access events comprising one or more keystroke events at the host platform and one or more commands inputted by the user at the host platform, wherein the one or more access events are captured by a continuous authentication agent associated with the host platform;

train a machine learning model with a list of known fraudulent access events, a list of known authenticated browsing behaviors, and previously authenticated browsing behavior of the user;

identify at least one fraudulent access event based at least in part on executing the machine learning model to perform a pattern matching between the previously authenticated browsing behavior of the user and the one or more access events at the host platform; and generate a challenge question for reauthenticating the user of the host platform based at least in part on identifying the at least one fraudulent access event.

18. The non-transitory computer-readable medium of claim 17, wherein the instructions are further executable by the at least one processor to:

receive, from the host platform, an indication of an initial login authorization event prior to an occurrence of the one or more access events, wherein the initial login authorization event corresponds to a first authorization method; and monitor the one or more access events for fraudulent access events in response to receiving the indication of the initial login authorization event.

* * * * *